United States Patent [19]
Hohberg

[11] Patent Number: 5,306,892
[45] Date of Patent: Apr. 26, 1994

[54] MIRROR OBJECTIVE ARRANGEMENT

[75] Inventor: Gerhard Hohberg, Aalen-Dewangen, Fed. Rep. of Germany

[73] Assignee: Carl-Zeiss-Stiftung, Heidenheim, Fed. Rep. of Germany

[21] Appl. No.: 901,729

[22] Filed: Jun. 22, 1992

[30] Foreign Application Priority Data

Jun. 22, 1991 [DE] Fed. Rep. of Germany ....... 4120684

[51] Int. Cl.$^5$ ............................................. B23K 26/06
[52] U.S. Cl. ............................... 219/121.67; 359/859; 359/863; 219/121.74
[58] Field of Search ....................... 359/858, 859, 863; 219/121.67, 121.72, 121.73, 121.74

[56] References Cited

U.S. PATENT DOCUMENTS

| | | |
|---|---|---|
| 3,790,258 | 2/1974 | Rambauske . |
| 4,030,816 | 6/1977 | Belke et al. . |
| 4,161,351 | 7/1979 | Thomas et al. . |
| 4,518,232 | 5/1985 | Dagenais ........................ 219/121.74 |
| 4,547,650 | 10/1985 | Arditty et al. .................. 219/121.74 |
| 4,812,613 | 3/1989 | Gorisch ......................... 219/121.74 |

OTHER PUBLICATIONS

"Unobscured-aperture two-mirror systems" by R, Gelles, Journal of the Optical Society of America, vol. 65, No. 10, 1975, p. 1141.

Primary Examiner—Edward K. Look
Assistant Examiner—F. Daniel Lopez
Attorney, Agent, or Firm—Walter Ottesen

[57] ABSTRACT

The invention is directed to a pancratic mirror objective system for laser focussing and especially for laser machining apparatus. The pancratic mirror objective system preferably includes a convex paraboloid mirror and an ellipsoid mirror. The ellipsoid mirror can be approximated by a toric or spherical form. The focus $F_1$ of the paraboloid mirror P and the first focus of the ellipsoid mirror E are coincident. By rotating the ellipsoid mirror E about the axis parallel to the incident laser beam through the first focus $F_1$, the effective image side aperture (for example K=4 to K=8) and the focal length are varied. The track control compensates for the movement of the focus $F_2$ in laser machining apparatus.

10 Claims, 2 Drawing Sheets

MIRROR OBJECTIVE ARRANGEMENT

FIELD OF THE INVENTION

The invention relates to a mirror objective arrangement having two mirrors. Arrangements of this kind having a fixed geometry and focal length are known in various configurations also with paraboloid and ellipsoid mirrors. The invention also relates to a laser machining apparatus incorporating the mirror objective arrangement.

BACKGROUND OF THE INVENTION

For machining materials with lasers, the machining result is very critically dependent upon the energy distribution at the focus. This applies especially to laser cutting. Here, lasers are preferably utilized which radiate in a low mode and therefore supply an approximately diffraction limited focus distribution. An adaptation of the focus distribution to the requirements (for example, determined by the type of material and the material thickness) can, in this case, be obtained practically only by means of the effective aperture and therefore the focal length of the focussing optics. For this reason, different focal lengths are used depending upon the application. When the requirements change frequently, then the need for focussing optics having a changeable aperture increases in order to reduce the change-over time.

Such systems have long been utilized when using lens optics. Here, complete pancratic focussing units or pancratic expansion or contraction systems in combination with fixed focussing optics are utilized.

Lens systems are only of use to a limited extent when utilizing lasers of high capacity. For this reason, the lens systems are increasingly replaced with mirror optics which can be loaded to a significantly greater extent. However, only embodiments having a fixed aperture are known.

SUMMARY OF THE INVENTION

In view of the foregoing, it is an object of the invention to provide a mirror objective arrangement which is configured as a pancratic system.

The mirror objective arrangement of the invention includes: a first mirror having a shape which at least approximates a paraboloid form and defining a first focus $F_1$; a second mirror having a shape which at least approximates an ellipsoid form; the second mirror being in a first position wherein the second mirror images the first focus $F_1$ at an initial second focus $F_2$; and, pivot means for pivoting the second mirror about a pivot axis passing through the first focus $F_1$ from the first position to a second position so as to cause the second mirror to image the first focus $F_1$ at a new second focus $F_2'$.

The pancratic system of the invention includes two mirrors with one of these mirrors being configured at least approximately as a paraboloid mirror and the other one being configured at least approximately as an ellipsoid mirror. The laser beam is focussed by the paraboloid mirror. This focus is positioned in the one focal point of the ellipsoid mirror and is imaged by the ellipsoid mirror into the other focal point thereof.

The change of the effective aperture does not take place in the manner conventional with lens systems by changing the spacing between the optical elements; instead, by changing the angle between the optical elements, that is, the angle between the paraboloid mirror and ellipsoid mirror.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
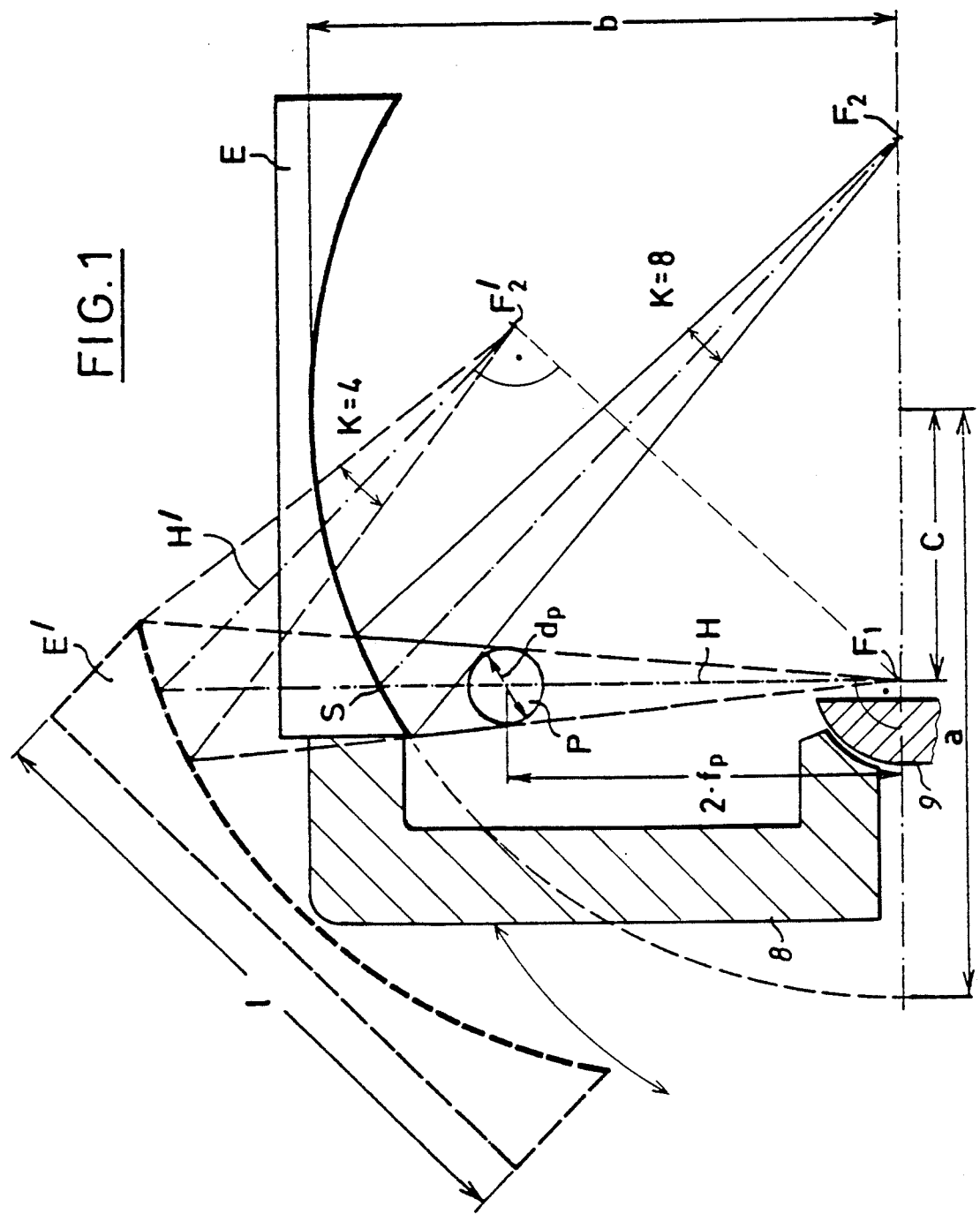
FIG. 1 is a schematic of the mirror objective arrangement of the invention showing the paraboloid mirror and the ellipsoid mirror thereof disposed in spaced relationship to each other and how the ellipsoid mirror is moved relative to the paraboloid mirror.

In FIG. 1, a laser beam impinges perpendicularly to the plane of the paper on the convex paraboloid mirror P and is reflected so that a virtual focus at $F_1$ is formed. The ellipsoid mirror E is first in a position having an image-side aperture $K=8$ and images $F_1$ at $F_2$.

Figure 2:
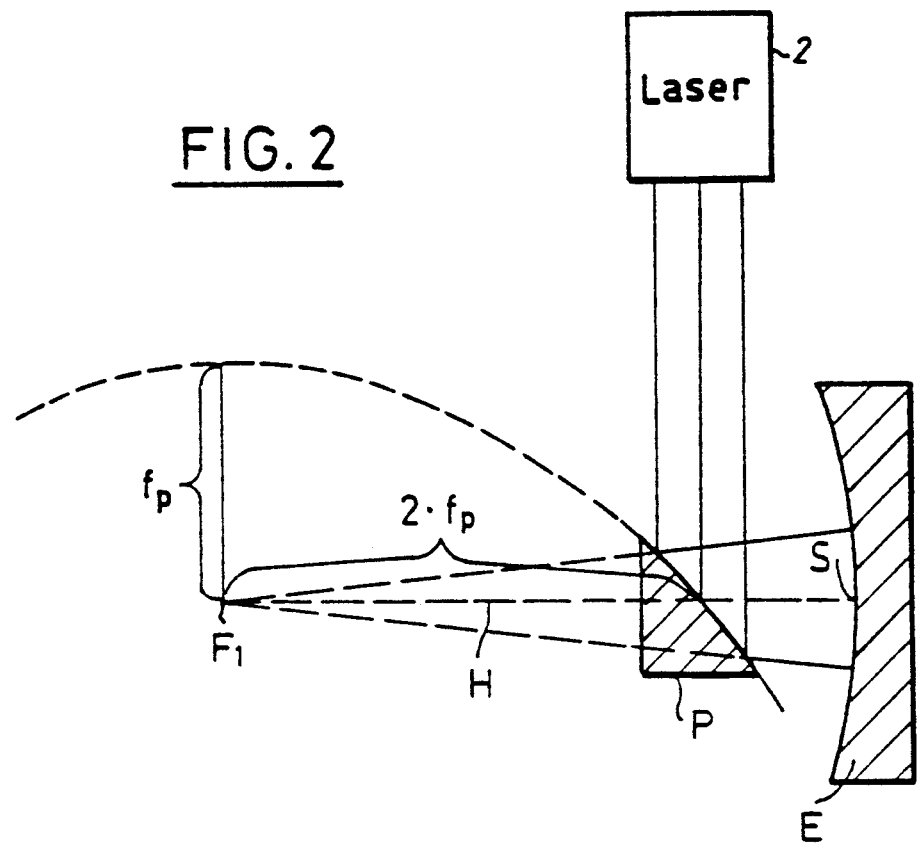
FIG. 2 is a section view taken through the axis $F_1$-S of FIG. 1.

As shown in FIG. 2, a section of paraboloid mirror P is illuminated by the laser 2 at an elevation which corresponds to twice the vertex focal length $f_p$ so that a mean deflection of 90° takes place.

In the embodiment shown, the ellipsoid mirror E is so dimensioned that a variation of the image side aperture by a factor of two is possible between $K=4$ and $K=8$. Preferably, the ellipsoid mirror E is so configured that the end positions (E, E') are symmetrical. Then, the incident beam (generated by paraboloid mirror P) must have an aperture of $K=5.6$ (geometric mean). Thus, for a diameter of the beam of $dp=40$ mm, an effective focal length of the paraboloid mirror P is required which is twice the vertex focal length $f_p$ in the embodiment or $2 \cdot f_p = 225$ mm. A minimum spacing must be maintained between the two mirrors (P, E) so that the reflected beam is not shaded. The spacing $F_1$-S should be at least 300 mm for the dimensions given above.

The precise form of the ellipsoid mirror E is not yet determined. A further parameter can be arbitrarily selected. In FIG. 1, the additional requirement is introduced that a primary ray H or H' should be perpendicular to the axis of the ellipsoid mirror E in the extreme positions. With these requirements, an ellipsoid mirror E is obtained having the values $a=362$ mm, $b=329$ mm for the half axes and $c=151$ mm for the half focal point spacing. The minimum length of the mirror necessary for the application is $L=366$ mm.

Changes of the arbitrary parameter have only a slight influence on the required length of the mirror. The dimensions of the arrangement can be varied widely.

If the ellipsoid mirror E is rotated about the axis through the first focus $F_1$ wherein the holder 8 rotates about the bearing 9, then the second ellipsoid focus $F_2$ moves while at the same time the aperture of the beam focussed there changes and therefore the focal length of the entire system. The above-mentioned axis is perpendicular to the plane of the paper but parallel to the incident laser beam. The new position of the ellipsoid mirror is identified by E' and is shown in phantom outline in FIG. 1. The ellipsoid mirror E' has an aperture $K=4$ and a focus $F_2'$.

While for camera-related variable-focus lenses with changing focal lengths the image must always be formed on the plane of the film, it is not a problem for the mirror objective arrangement of the invention for the application to laser machining that the focus $F_2$, $F_2'$ moves along a circular arc.

Figure 3:
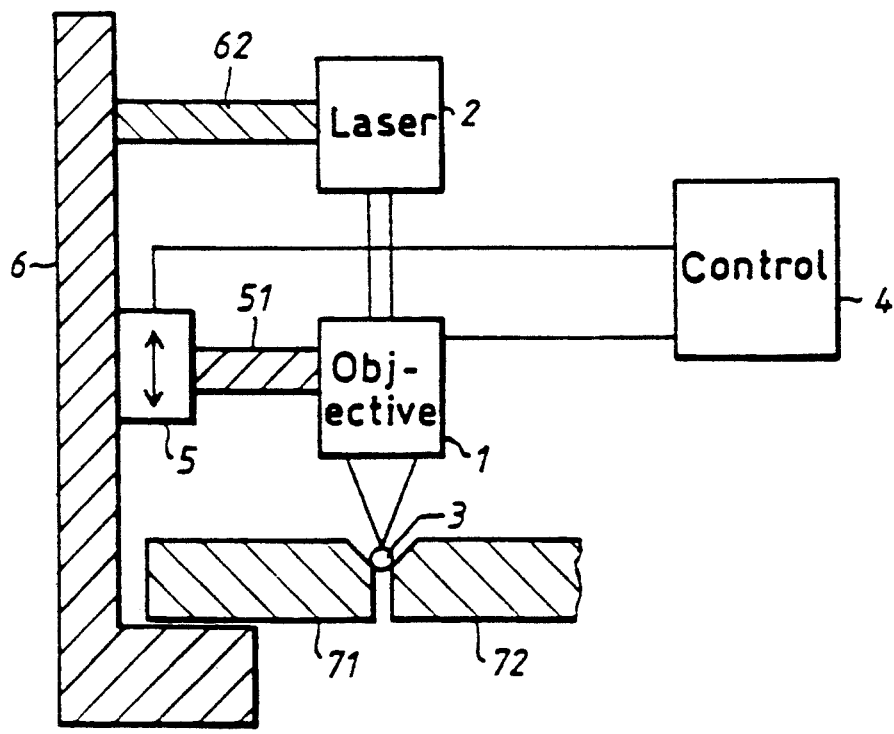
FIG. 3 shows a laser machining arrangement according to an embodiment of the invention.

A laser machining apparatus often has a track control 4 as shown in FIG. 3 for the movement of a laser head (1, 2) relative to the workpiece (71, 72). The laser head (1, 2) includes the laser 2 and the objective 1. The track control 4 can be so programmed for the use of the pancratic system 1 of the invention that the position of the machining point 3, that is the focus ($F_2$, $F_2'$) is always considered relative to the laser head (1, 2). The position of the machining point 3 is dependent upon the desired focal length or aperture.

The beam direction of the emitted beam is not significantly changed with the variation of the effective focal length. The use of an ellipsoid mirror for forming a finite image achieves a trouble-free joining of beams.

In some cases, slight imaging errors are accepted when in this way, a mirror can be used which is more simple to produce.

In the case of FIG. 1, the ellipsoid mirror can be replaced, for example, by a toric surface having a primary radius of curvature in the plane of the drawing of:

$$R_1 = a^2/b = 362^2/329 = 398 \text{ mm}$$

and perpendicularly thereto, $$R_2 = b = 329 \text{ mm}.$$

A still coarser approximation is obtained with a spherical surface. However, the imaging error is significant, especially the astigmatism.

The paraboloid mirror shown in FIG. 1 can be replaced with a surface, which is simpler to produce, when a deterioration of the focus quality is permissible.

A spherical surface would cause very considerable imaging errors in the arrangement shown, that is, with a 90° beam deflection. For this reason, a sphere having the smallest possible deflection angle would be used. The component of the astigmatism can be substantially eliminated by using a toric surface.

It is also plausible to dimension the astigmatic error components of both mirrors so that they compensate when added. However, this appears to be advantageous only in rare cases since modern manufacturing machines are available in most cases with which the ellipsoid and paraboloid surfaces can be produced with no problem and at acceptable cost.

It is understood that the foregoing description is that of the preferred embodiments of the invention and that various changes and modifications may be made thereto without departing from the spirit and scope of the invention as defined in the appended claims.

What is claimed is:

1. A mirror objective arrangement comprising:
   a first mirror having a shape which at least approximates a paraboloid form and defining a first focus $F_1$;
   a second mirror having a shape which at least approximates an ellipsoid form;
   said second mirror being in a first position wherein said second mirror images said first focus $F_1$ at an initial second focus $F_2$; and,
   pivot means for pivoting said second mirror about a pivot axis passing through said first focus $F_1$ from said first position to a second position so as to cause said second mirror to image said first focus $F_1$ at a new second focus $F_2'$.

2. The mirror objective arrangement of claim 1, wherein the effective aperture K of light focussed at said initial second focus $F_2$ is varied when focussed at said new second focus $F_2'$.

3. The mirror objective arrangement of claim 2, wherein the variation of said effective aperture can vary between K=4 and K=8.

4. The mirror objective arrangement of claim 1, further comprising a laser light source for supplying a laser beam defining a beam axis parallel to said pivot axis and incident upon said first mirror for focussing at said first focus $F_1$.

5. The mirror objective arrangement of claim 1, wherein said first mirror is convex.

6. The mirror objective arrangement of claim 1, said first mirror being a precision paraboloid mirror and said second mirror being a precision ellipsoid mirror.

7. The mirror objective arrangement of claim 1, wherein said paraboloid form of said first mirror is approximated by a toric surface and said ellipsoid form of said second mirror is approximated by a toric surface.

8. The mirror objective arrangement of claim 1, wherein said paraboloid form of said first mirror is approximated by a toric surface.

9. The mirror objective arrangement of claim 1, wherein said ellipsoid form of said second mirror is approximated by a toric surface.

10. A laser machining apparatus for machining a workpiece, said apparatus comprising:
    a laser head including laser means for supplying a laser beam defining a beam axis; and, a mirror objective arrangement mounted on said beam axis for directing said laser beam to a machining point on the workpiece;
    said mirror objective arrangement having an adjusted focal length and including: a first mirror having a shape which at least approximates a paraboloid form and defining a first focus $F_1$; a second mirror having a shape which at least approximates an ellipsoid form; said second mirror being in a first position wherein said second mirror images said first focus $F_1$ at an initial second focus $F_2$; and, pivot means for pivoting said second mirror about a pivot axis passing through said first focus $F_1$ from said first position to a second position so as to cause said second mirror to image said first focus $F_1$ at a new second focus $F_2'$; and,
    track control means for controlling said laser head to change the location of said machining point relative to said laser head so as to cause said machining point to be coincident with said focus ($F_2$, $F_2'$).

* * * * *